Dec. 27, 1927.  
W. G. ESTEP  
FAUCET  
Filed March 22, 1927

1,653,997

Inventor  
W. G. Estep  
By C. A. Snow & Co.  
Attorneys.

Patented Dec. 27, 1927.

1,653,997

UNITED STATES PATENT OFFICE.

WILLIAM G. ESTEP, OF DUQUESNE, PENNSYLVANIA.

FAUCET.

Application filed March 22, 1927. Serial No. 177,349.

This invention relates to a faucet or spigot of the type generally used in connection with wash stands and the like.

It is an object of the invention to provide a device of this type having a check valve which will close automatically when the main valve is removed so that repairs can be made without the necessity of shutting off the supply of water to the spigot.

It is a further object of the invention to mount the main valve and the parts associated therewith within a removable cage which, when seated within the valve casing of the spigot will act as a means for holding the check valve unseated so that the flow of water through this spigot will be controlled solely by the main valve.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings.

Figure 1:
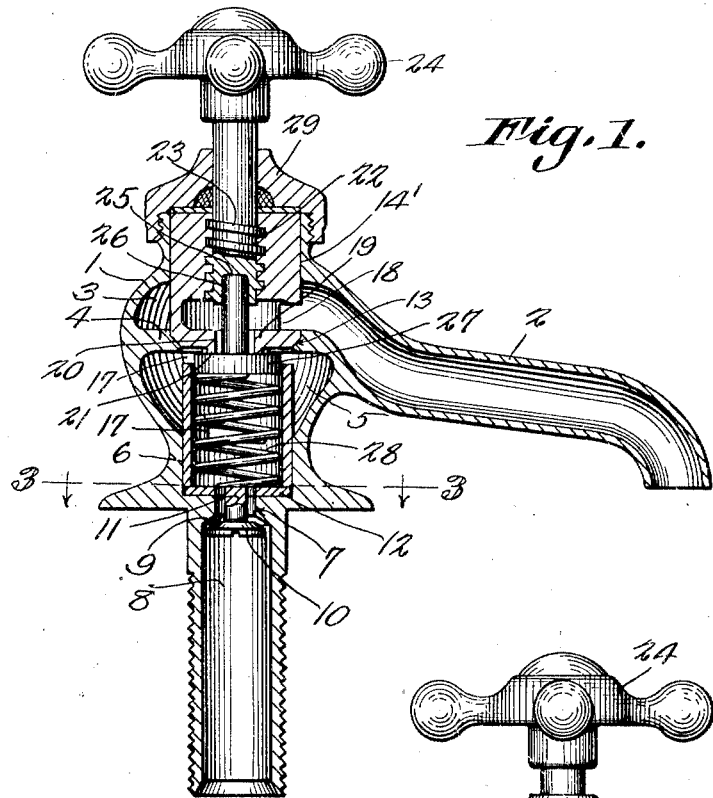
Figure 1 is a section through a faucet or spigot having the present improvements combined therewith.
Figure 2:
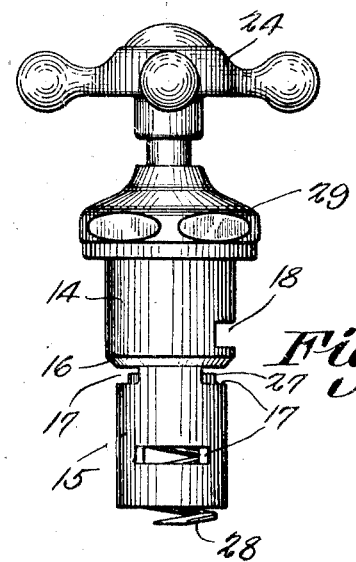
Figure 2 is an elevation of the cage removed from the valve casing.
Figure 3:
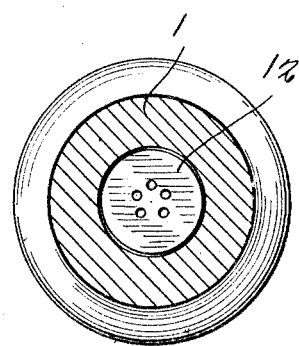
Figure 3 is a section on line 3—3, Figure 1.

Referring to the figures by characters of reference 1 designates the casing of the faucet or spigot provided with an outlet nozzle 2 communicating with a compartment 3 provided in the upper portion of the casing and above a partition 4, there being an inlet compartment 5 within the casing and below this partition. The bottom of the compartment 5 is formed with a cylindrical socket 6 communicating, through a passage 7, with the interior of the tubular extension 8 to which the supply pipe is adapted to be coupled. A valve seat 9 is provided around the passage 7 and is adapted to be closed by a check valve 10 the stem 11 of which projects through the passage 7 and is formed integral with or suitably connected to the center of an apertured disk 12 at the bottom of the recess 6.

Formed within the partition 6 is a large tapered opening 13. The upper end of the valve casing 1 has a cylindrical opening 14'. The diameter of the recess 6 is equal to or less than the smallest diameter of the opening 13.

Insertible into the casing 1 is a cage consisting of an upper cylindrical portion 14 and a lower cylindrical portion 15, the lower portion being of less diameter than the upper portion and there being a tapered seat 16 between said portions. A desired number of ports 17 are formed within the cylindrical portion 15 while another port 18 is formed within the cylindrical port 14. The cage is open at the bottom while the interior thereof is divided into two portions by a partition 19 located between the ports 17 and 18. This partition has a passage 20 therein surrounded by a valve seat 21. A threaded opening 22 is formed in the upper end of the cage for the reception of the threaded stem 23. This stem has means 24 at its upper end whereby it can be rotated readily. A socket 25 is formed at the inner end of the stem 23 for the reception of one end portion of the stem 26 of a main valve 27. This main valve is located below the partition 19 and is adapted to be guided by the lower portion 15 of the cage. In this lower portion is located a coiled spring 28 which bears constantly against the main valve.

The external diameter of the lower portion 15 of the cage is substantially equal to the diameter of the recess 6. The tapered shoulder 16 is so shaped and proportioned as to fit snugly against the seat 13. The upper end portion 14 of the cage is adapted to fit snugly within the opening 14 in the casing 1.

The cage with the spring 28, valve 27 and stem 23 therein is insertible downwardly into the casing 1 so that the portion 15 will fit snugly onto the disk 12 and within the recess 6 while the shoulder 16 will fit snugly on the seat 13. Thus the valve 10 will be unseated and held unseated by the depressed disk 12 while spring 28 will act to hold the main valve 27 pressed toward its seat 21. By turning the stem 23 in one direction the valve 27 can be forced against its spring so as to move away from its seat. Consequently fluid can flow through the apertured disk 12 and around the main valve 27 to passage 20 and thence to the outlet nozzle 2. By reversing the rotation of stem 23 valve 27 will be pushed against its seat by the spring 28.

It is to be understood of course that the cage is to be held fixedly in the casing 1 by any suitable means. In the structure shown a screw cap 29 which engages the top of the casing 1 is employed for this purpose.

Should it be desired to make repairs to the spigot or faucet the screw cap 29 is detached from the casing and the cage is withdrawn longitudinally from the casing. As soon as pressure is removed from the disk 12 the check valve 10 will be thrust against its seat 9 by the pressure of fluid thereagainst. Consequently fluid cannot escape through the faucet while the cage is out of position.

After the desired repairs or replacements have been made the cage can be reinserted into the casing and secured by means of the cap 29.

It will be understood of course that when the main valve 27 is opened the water in flowing through the casing will pass from the passage 7 into the lower portion 15 of the cage and thence through the lower port 17 into compartment 5 and from said compartment through the upper ports 17. Here the liquid will pass over the depressed valve 27 to the passage 20 and thence out through the port 18 to the nozzle 2.

What is claimed is:

In a device of the class described a casing having an inlet and an outlet and a partition between the inlet and outlet provided with an opening, an apertured disk seated in the casing, a check valve integral therewith and supported within the inlet, said valve being movable under the pressure of liquid flowing toward the inlet, thereby to close said inlet, a cage slidable into the casing and having an open end movable against the disk to hold the check valve unseated, said cage including cylindrical end portions of different diameters and an intermediate shoulder separating the end portions, said shoulder being movable against the wall of the opening in the partition, there being ports within one end portion of the cage and an outlet port in the other end portion of the cage, there being a passage between said end portions, a valve within one of the end portions of the cage, a spring housed within said end portion for holding the valve normally positioned to close the passage in the cage, the disk of the check valve constituting a seat for the spring, means carried by one end portion of the cage for unseating the spring pressed valve, one end portion of the cage constituting a guide and housing for said valve when unseated, and means engaging the case for holding the cage within the casing and pressed against the disk of the check valve.

In testimony that I claim the foregoing as my own, I have hereto affixed my signature.

WILLIAM G. ESTEP.